United States Patent [19]

Smith, Jr. et al.

[11] 4,380,701
[45] Apr. 19, 1983

[54] NUCLEAR WELL LOGGING WITH NEUTRON SOURCE AND SEPARATE SPACED RADIATION DETECTORS TO DETERMINE SILICON/OXYGEN RATIO

[75] Inventors: Harry D. Smith, Jr.; Ward E. Schultz, both of Houston, Tex.

[73] Assignee: Texaco Inc., White Plains, N.Y.

[21] Appl. No.: 192,967

[22] Filed: Oct. 2, 1980

[51] Int. Cl.³ ............................................. G01V 5/00
[52] U.S. Cl. .................................. 250/266; 250/270
[58] Field of Search ............... 250/256, 262, 265, 266, 250/269, 270

[56] References Cited

U.S. PATENT DOCUMENTS

| | | | |
|---|---|---|---|
| 2,508,772 | 5/1950 | Pontecorvo | 250/266 |
| 2,963,587 | 12/1960 | Rickard | 250/270 |
| 3,521,062 | 7/1970 | Nagel | 250/266 |
| 3,887,805 | 6/1975 | Schuster | 250/266 |
| 3,943,363 | 3/1976 | Peelman | 250/262 |
| 3,959,648 | 5/1976 | Pitts, Jr. et al. | 250/262 |

*Primary Examiner*—Eugene La Roche
*Assistant Examiner*—Janice A. Howell
*Attorney, Agent, or Firm*—Carl G. Ries; Robert A. Kulason; Jack H. Park

[57] ABSTRACT

Earth formations surrounding a well borehole are bombarded with high energy neutrons which react with chemical elements in the formation components, giving rise to gamma radiation. The gamma radiation is detected by two separate, spaced detectors from which well logs are obtained indicating a ratio of the relative presence of silicon to oxygen in the formations.

20 Claims, 1 Drawing Figure

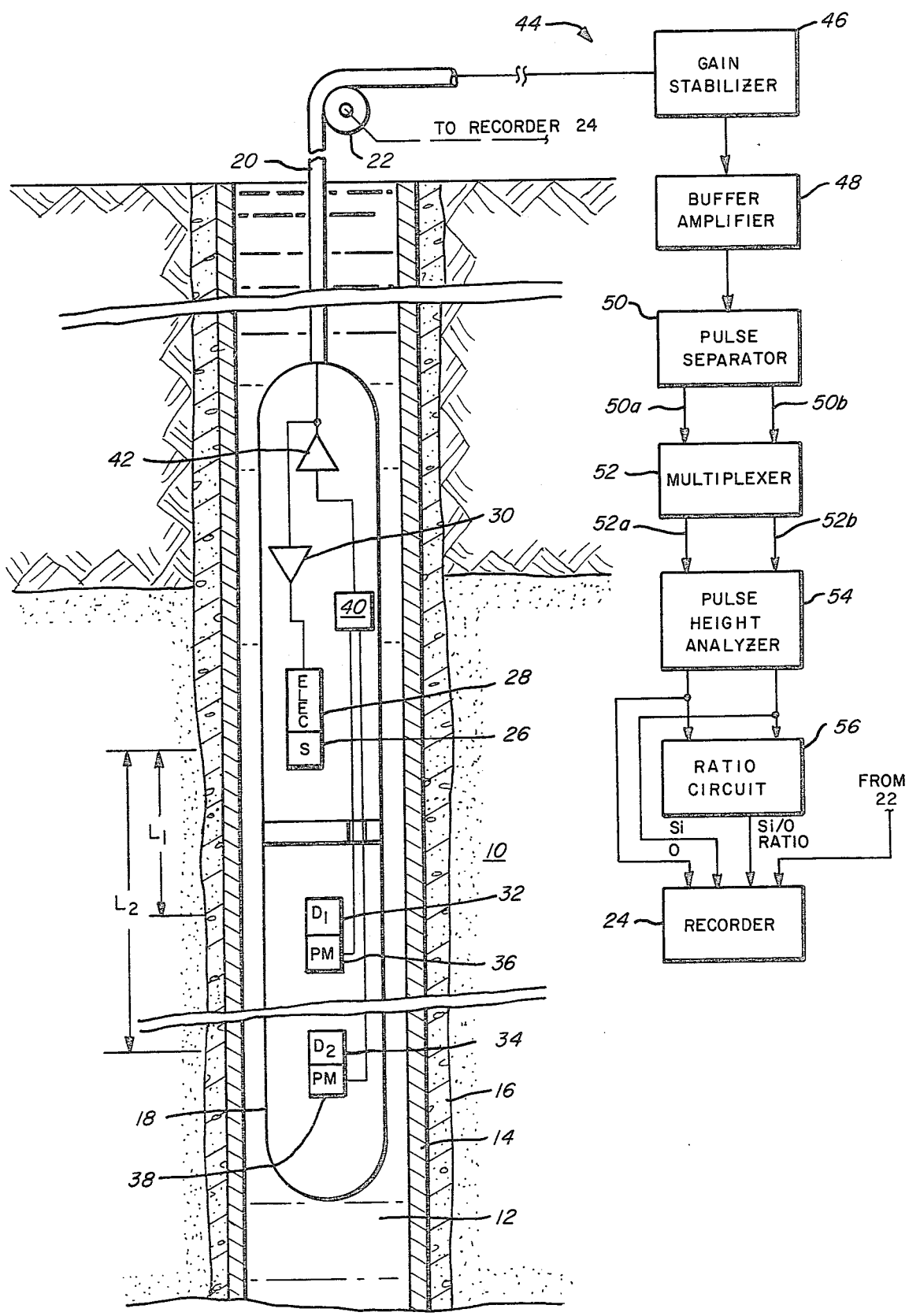

NUCLEAR WELL LOGGING WITH NEUTRON SOURCE AND SEPARATE SPACED RADIATION DETECTORS TO DETERMINE SILICON/OXYGEN RATIO

BACKGROUND OF INVENTION

1. Field of Invention

The present invention relates to neutron bombardment nuclear well logging.

2. Description of the Prior Art

At one time, it had generally been considered incompatible to perform a simultaneous log of both the silicon and oxygen components of earth formations in the vicinity of a well borehole.

Detection methods have centered on measuring either oxygen or silicon independently, since for reasonable source to detector spacings, oxygen activation required a fast logging speed due to the short (7.35 seconds) half life of gamma radiation from the radioactive isotope nitrogen-16. Conversely, silicon activation required a slow logging speed because of the longer (2.3 minutes) half life of gamma radiation from the radioactive isotope aluminum-28. Problems thus arose in attempting to log silicon and oxygen simultaneously by other techniques, because of the conflicting spacing and logging speed requirements due to the large difference in half lives of their radioactive isotopes of interest.

U.S. Pat. No. 3,943,362, of common ownership herewith, related to simultaneous determination of the relative silicon and oxygen content of an earth formation surrounding a well borehole. A neutron source was activated to bombard the formation, causing among others the $O^{16}(n, p)N^{16}$ reaction where oxygen was present and the $Si^{28}(n, p)Al^{28}$ reaction where silicon was present. A single detector and photomultiplier tube with associated electronics formed and furnished an electrical signal, representative of detected gamma rays from these nuclear reactions, which was transmitted to a pulse height analyzer or analyzers in a surface circuit. The pulse height analyzer counted pulses in two energy windows, one for an oxygen peak at 6.13 MeV and one for an aluminum peak at 1.78 MeV. However, the energy windows set for aluminum also encompassed Compton scattering low energy gamma ray events, particularly from the 6.13 MeV gamma rays. Accordingly, an initial determination of background count rate was required, using a specified calibration procedure to compensate for the Compton scattering events.

U.S. Pat. No. 3,928,762 of common ownership herewith detected and measured, among other measurements, the hydrogen/oxygen ratio of earth formations using nuclear well logging methods. U.S. Pat. No. 3,959,648 related to an apparatus for detecting and measuring the same or two different conditions with separate detectors in nuclear well logging. Other prior art of which applicants are aware having two or more detectors are U.S. Pat. Nos. 2,508,772 and 2,963,587. In the first of these patents, radiation was logged at plural detectors spaced differing distances from a source so that decay of radiation intensity as a function of distance, an indicator of the nature of the formation, was obtained. In the other of these patents, the plural detectors were moved to the formation of interest different times after neutron bombardment, so that differences of count rate as a function of time gave an indication of decay rate, from which radiation half life is indicated. From the indicated half life, it was proposed to identify elements in the formation.

SUMMARY OF INVENTION

Briefly, the present invention provides a new and improved well logging apparatus for simultaneously obtaining a measure of the relative presence of the elements silicon and oxygen in earth formations in the vicinity of a fluid-filled borehole. The measure of the relative presence of silicon and oxygen is of assistance in determining formations of possible interest for producing hydrocarbons. A neutron source mounted in a sonde moving at a logging speed in the borehole bombards the earth formations, fluid in the borehole and the casing and other surrounding material with high energy neutrons some of which thereafter undergo neutron capture reactions with the bombarded material. Two detectors are mounted at spaced distances from each other and from the source to detect gamma radiation. The source and detectors are spaced from each other a distance such that when the farthest spaced detector is moved to a formation of interest after the formation has been bombarded with neutrons, substantially all gamma radiation from the 6.13 MeV $O^{16}(n,p)N^{16}$ reaction has dissipated. As used within the present invention, substantially all is intended to mean that the gamma radiation has decayed to a level within acceptable limits of logging accuracy, usually ten percent or less, of normal levels of that present at the time the detector most closely spaced from the source is adjacent the formation of interest. The spacing between the detectors may be adjusted according to the desired limits of logging accuracy and the logging speed of the sonde.

The neutron source may be a high energy continuous source or a pulsed neutron source. Sonde electronic circuitry forms electrical signals which are communicated to a pulse height analyzer of a surface processing circuit. The pulse height analyzer accumulates at least two counts, one for pulses representing detected gamma radiation in an energy range of from approximately 2.0 MeV to 7.25 MeV for oxygen produced isotopes detected by the most closely spaced detector in the sonde, the other for pulses representing detected gamma radiation in an energy range of from 0.5 to 2.0 MeV for silicon produced isotopes detected by the furthest spaced detector in the sonde. A ratio circuit is provided to form a signal representative of the ratio of the silicon gamma radiation counted to that of the oxygen gamma radiation counted.

BRIEF DESCRIPTION OF THE DRAWINGS

The single FIGURE of the drawing is a schematic diagram of a well logging apparatus of the present invention with a portion thereof disposed in a well borehole.

DESCRIPTION OF PREFERRED EMBODIMENT

In the drawings, a system for simultaneously obtaining a measure of the relative presence of the elements silicon and oxygen in earth formations, such as the one identified with reference numeral 10, in the vicinity of a fluid filled borehole 12 is set forth. Typically, the borehole 12 is surrounded by a casing 14 which is held in place in the formations by a cement annulus 16. However, it should be understood that the apparatus of the present invention may be used in an uncased borehole as well.

A downhole fluid tight body member or sonde 18 is suspended by a cable 20 in the borehole 12 and is adapted to be moved through the borehole 12 by the cable 20 at any of several specified logging speeds. The cable 20 passes over a sheave wheel 22 which is electrically or mechanically connected in a conventional manner so that measurements made in the borehole 12 in a manner set forth below may be plotted as a function of depth in the borehole 12 in a conventional recorder or data plotter 24.

In the sonde 18, a neutron source 26 of high energy neutrons is provided. Depending on logging parameters discussed below, the source 26 may be a pulsed neutron source driven by a conventional electronics circuit 28 in response to signals received at an amplifier 30 in the sonde 18 after transmission from the surface over the cable 20. Also, the source 26 may be a neutron generator. Alternatively, the source 26 may be a continuous neutron source, in which case the electronic circuit 28 and amplifier 30 are not required. The source 26 bombards the earth formations surrounding the borehole 12 with high energy neutrons, at an energy level of greater than 10 MeV, some of which react with chemical elements in the formation components, giving rise among other things to gamma radiation.

The sonde 18 also includes a first radiation detector 32 mounted a first distance $L_1$ from the source 26 and a second radiation detector 34 mounted a second and different distance $L_2$ from the source 26. The detectors 32 and 34 are preferably NaI(Tl) crystal detectors which produce flashes of light when gamma radiation penetrates the crystals. Light pulses are formed in the detectors 32 and 34 which are proportional in intensity to the energies of the penetrating gamma rays.

Photomultiplier tubes 36 and 38 are optically coupled to detectors 32 and 34, respectively, and convert light flashes from such detectors into data pulses whose height or voltage is proportional to the intensity of such light pulses and thus indicative of gamma ray energy detected in detectors 32 and 34.

Data pulses from photomultiplier tubes 36 and 38 are furnished to a sampling circuit 40 of the type shown in U.S. Pat. No. 3,959,648, of common ownership to this application, which is incorporated herein by reference as though fully set forth. The sampling circuit 40 periodically samples the data pulses from photomultipliers 36 and 38 and provides output pulses of opposite polarity for the photomultipliers 36 and 38. The opposite polarity pulses from the sampling circuit 40 have amplitudes corresponding to the amplitude of the data pulses received from photomultipliers 36 and 38 during each sampling period and are transmitted from a buffer amplifier 42 in the sonde 18 simultaneously over the cable 20 to a surface processing circuit 44 in the manner set forth in the previously mentioned U.S. Pat. No. 3,959,648.

In the surface processing circuit 44, incoming pulses from the cable 20 are first received in a gain stabilizer circuit 46 from which they are furnished through a buffer amplifier 48 to a pulse separator 50. The pulse separator 50 rectifies the incoming pulses of opposite polarity so that all are of the same polarity. The pulse separator 50 further transmits the pulses received from photomultiplier 36 and detector 32 over a first conductor 50a to a multiplexer 52. Similarly, the pulse separator 50 transmits the pulses from detector 34 and photomultiplier 38 over a second conductor 50b to the multiplexer 52.

The multiplexer 52 furnishes the pulses received from conductor 50a and pulse separator 50 over a conductor 52a to a pulse height analyzer 54. In a like manner, the multiplexer 52 furnishes the pulses received over conductor 50b to the pulse height analyzer 54 over a conductor 52b.

The pulse height analyzer 54 forms a separate running count of the pulses received over the conductors 52a and 52b, respectively, from the multiplexer 52. The pulse height analyzer 54 may be two single channel analyzers each connected to one of the conductors 52a and 52b, respectively, or alternatively may be a multichannel analyzer, one-half of whose memory is allocated to pulses from the conductor 52a, the other half allocated to pulses from the conductor 52b.

The pulse height analyzer 54 is biased so that pulses originating in detector 32 and photomultiplier 36 more closely spaced to the source 26 are for detected gamma radiation in an energy range or oxygen counting window of from approximately 2.0 MeV to approximately 7.25 MeV which includes the oxygen peak at 6.13 MeV resulting from the $O^{16}(n, p)N^{16}$ nuclear reaction and thus represent oxygen produced isotopes. The pulse height analyzer 54 is also biased to count pulses received from the conductor 52b representing detected gamma radiation in an energy range or silicon counting window of from approximately 0.5 MeV to 2.0 MeV including an aluminum peak at 1.78 MeV for the radioactive isotope aluminum-28 formed in the $Si^{28}(n,p)Al^{28}$ nuclear reaction where silicon is present in the formation being logged. The counts accumulated in the pulse height analyzer 54 for these two energy windows gives a relative indication of the presence of the elements silicon and oxygen in the formations of interest which, in turn, is of assistance in determining formations of possible interest for producing hydrocarbons.

The counts from the pulse height analyzer 54 are provided to a ratio circuit 56 and also to the recorder 24, so that a record of the relative presence of silicon and oxygen as a function of depth in the borehole 12 is available. In the ratio circuit 56, an electronic signal representing the ratio of counts in the energy window for silicon from 0.5 MeV to 2.0 MeV to that of the oxygen counts in the energy window from 2.0 to 7.25 MeV is formed. This silicon/oxygen ratio signal formed in the ratio circuit 56 is also provided to the recorder 24 so that a ratio of the silicon counts to oxygen counts as a function of depth in the borehole 12 is available.

In the past, detection methods have usually centered on measuring either oxygen or silicon independently, since for typical source to detector spacings oxygen activation requires a fast logging speed and silicon a slow logging speed. This required two separate logging runs at different speeds and thus increased the complexity and expense of logging to measure the relative presence of silicon and oxygen. For an element of interest having a half life T in minutes, the optimum logging speed $V_o$ for a source to detector spacing L in feet is obtained from the known equation:

$$V_o = 0.693 \, L/T \qquad (1)$$

It was thus thought undesirable to attempt to log for silicon and oxygen simultaneously in one logging run, because of the conflicting spacing and logging speed requirements due to their large difference in half lives of their radioactive isotopes. Another factor discouraging simultaneous logging of silicon and oxygen was interference of Compton scattering low energy gamma ray events with counts in the silicon counting window.

Applicants have, however, found a solution to this problem with the two independent detectors 32 and 34 in the sonde 18, the first detector 32 at a shorter spacing $L_1$ which is optimized for the oxygen signal, and the second detector 34 at a longer spacing $L_2$ for the silicon signal. According to the present invention, the source 26 is spaced or separated from detectors 32 and 34 distances $L_1$ and $L_2$, respectively, such that when the farthest spaced detector 34 is moved to a formation of interest after the formation has been bombarded with neutrons from source 26, substantially all gamma radiation from the 6.13 MeV $O^{16}(n,p)N^{16}$ reaction has dissipated. As used within the present invention, substantially all is intended to mean that the gamma radiation has decayed to a level within acceptable limits of interference, usually ten percent or less, of radiation levels present at the time the detector 32 most closely spaced from the source 26 is adjacent the formation or formations of interest. The spacing between the detectors may be adjusted according to the desired limits of interference and the logging speed of the sonde. Under this definition, the detector 34 may or may not be optimized, but does produce a silicon signal with little oxygen interference.

Another way of specifying the distances $L_1$ and $L_2$ according to the present invention is to define the amount or factor by which the second distance $L_2$ exceeds the first distance $L_1$. Where $L_2$ is more than twice as large as $L_1$, the factor as defined in the foregoing manner is two or more.

By way of illustrative examples, using a logging speed of 25 feet per minute (fpm), the oxygen detector 32 is placed about 4.5 feet from the source 26 and the silicon detector 34 is placed 83 feet from the source 26 for an optimum reading for such a logging speed. For this spacing of a factor of approximately 18.78, gamma radiation from the 6.13 MeV peak for oxygen will be substantially dissipated and be indiscernible.

If shorter spacing is desired, with the distance $L_1$ unchanged and a spacing of, for example, 12 feet for distance $L_2$ and a factor of 2.67, the oxygen interference with silicon would be reduced to only about 8% of that which was present when oxygen detector 32 was adjacent the formation of interest, but still within the requirements of substantially all according to the present invention.

Using a logging speed of 15 fpm for sonde 18, the oxygen detector 32 is placed at 31" from the source 26, requiring the source 26 to be pulsed to eliminate counting prompt gamma rays and neutrons. The silicon detector 34 ideally is placed at 50 feet from source 26 or a factor of approximately 18.8. However, for the same distance $L_1$ and a 12 foot spacing $L_2$ or a factor of approximately 4.65, the oxygen interference is reduced to only about 1% that present when detector 32 is adjacent formations of interest.

Although the source 26 is shown in the drawing located a distance $L_1$ above detector 32 and a distance $L_2$ above detector 34, the positions of sources and detectors in sonde 18 could be reversed with source 26 a distance $L_1$ below detector 32 and a distance $L_2$ below detector 34. As will be understood, although the sonde 18 is shown in the drawing as a single sonde, a number of sonde modules may be used depending on the spacings necessitated by distances $L_1$ and $L_2$. Typically, the source 26 and detector 32 are in the same sonde module and detector 34 also in this module, unless extreme spacings are required to substantially entirely remove oxygen interferences. In extreme spacings, the detector 34 is located in a second module, with both modules electrically connected with the surface electronics 44 by the cable 20 and electrically interconnected with each other by an extension thereof. The sampling circuit 20 could be in either module. Also, three separate modules, one for the source and one for each detector could be utilized, each interconnected with each other and the surface in the foregoing manner.

In general, reduction of oxygen interference in the silicon detector 34 requires slower logging speeds and pulsed mode operation of source 26 or very long spacings for the silicon detector 34. Faster logging speeds increase the oxygen interference in silicon detected, but enable a user to operate the neutron generator 26 in continuous mode.

The ratio circuit 56 forms a particularly useful indicator by taking the ratio of counts (Si/O) from the silicon detector 34 to those from the oxygen detector 32. This Si/O indicator is useful in measuring hydrocarbon saturations in that sands or shales, oxygen content decreases as hydrocarbon content increases since oil and gas contain no oxygen, whereas water, the other possible formation fluid, does contain oxygen. The Si/O indicator can also distinguish sand from formations having lower silicon content. Taking the ratio of silicon to oxygen activation eliminates changes due to fluctuations in neutron output without using a separate neutron monitor. Variations in logging speed also do not affect the silicon to oxygen ratio as much as the individual counts.

The foregoing disclosure and description of the invention are illustrative and explanatory thereof and various changes in the size, shape and materials as well as in the details of the preferred embodiment may be made without departing from the spirit of the invention.

We claim:

1. A well logging apparatus for simultaneously obtaining a measuring of the relative presence of the elements silicon and oxygen in earth formations in the vicinity of a fluid-filled well borehole, comprising:
   (a) sonde means for moving through the well borehole past formations of interest;
   (b) source means mounted in said sonde means for bombarding the formation with high energy neutrons;
   (c) first detector means mounted in said sonde spaced a first distance from said source means for detecting gamma radiation from neutron activation of oxygen;
   (d) second detector means mounted in said sonde spaced a second distance from said source means for detecting gamma radiation from neutron activation of silicon;
   (e) said second distance being such that when said second detector is moved to a formation of interest substantially all oxygen activation gamma radiation has dissipated; and
   (f) sonde circuit means for forming electrical signals representing gamma radiation detected by said first and second detectors.

2. The well logging apparatus of claim 1, further including:
   (a) surface processing circuit means for processing the electrical signals from said circuit means; and (b) logging cable means for communicating electrical signals between said sonde circuit means and said surface processing circuit means.

3. The well logging apparatus of claim 2, wherein said logging cable means further comprises:
    means for moving said sonde means through the well borehole.

4. The well logging apparatus of claim 2, wherein said surface processing circuit means includes:
    pulse height analyzer means.

5. The well logging apparatus of claim 4, where each of said first and second detectors includes:
    (a) crystal means for forming light pulses varying in intensity according to gamma radiation detected;
    (b) photomultiplier means for forming electrical pulses varying in height according to the light pulses formed in said crystal means.

6. The well logging apparatus of claim 4, wherein said pulse height analyzer means comprises:
    (a) first analyzer means for counting pulses representing detected gamma radiation in an energy range of from approximately 2.0 MeV to 7.25 MeV for oxygen produced isotopes; and
    (b) second analyzer means for counting pulses representing detected gamma radiation in an energy range of from approximately 0.5 MeV to 2.0 MeV for silicon produced isotopes.

7. The well logging apparatus of claim 6, wherein said surface processing circuit further includes:
    ratio circuit means for forming a signal representative of the ratio of counts from said second analyzer means to those of said first analyzer means.

8. The well logging apparatus of claim 6, wherein said cable means includes:
    (a) means for communicating electrical signals representing gamma radiation detected in said first detector means to said first analyzer means; and
    (b) means for communicating electrical signals representing gamma radiation detected in said second detector means to said second analyzer means.

9. The well logging apparatus of claim 1, wherein said sonde means comprises:
    (a) a source sonde module for containing said source means;
    (b) a first detector sonde module for containing said first detector means; and
    (c) a second detector sonde module for containing said second detector means.

10. The well logging apparatus of claim 1, wherein said sonde means comprises:
    (a) a first sonde module for containing said source means and said first detector means; and
    (b) a second sonde module for containing said second detector means.

11. The well logging apparatus of claim 1, wherein said sonde means comprises:
    sonde means for containing each of said source means and said first and second detector means.

12. The well logging apparatus of claim 1, wherein said source means comprises:
    a continuous neutron source.

13. The well logging apparatus of claim 1, wherein said source means comprises:
    a pulsed neutron source.

14. A well logging apparatus for simultaneously obtaining a measure of the relative presence of the elements silicon and oxygen in earth formations in the vicinity of a fluid-filled well borehole, comprising:
    (a) sonde means for moving through the well borehole past formations of interest;
    (b) source means mounted in said sonde means for bombarding the formation with high energy neutrons;
    (c) first detector means mounted in said sonde spaced a first distance from said source means for detecting gamma radiation produced by oxygen activation;
    (d) second detector means mounted in said sonde spaced a first distance from said source means for detecting gamma radiation produced by silicon activation;
    (e) said second distance exceeding said first distance by a factor of two or more; and
    (f) sonde circuit means for forming electrical signals representing gamma radiation detected by said first and second detectors.

15. The well logging apparatus of claim 14, further including:
    (a) surface processing circuit means for processing the electrical signals from said circuit means; and
    (b) logging cable means for communicating electrical signal between said sonde circuit means and said surface processing circuit means.

16. The well logging apparatus of claim 14, further including:
    said second distance exceeding said first distance by a factor of four or more.

17. The well logging apparatus of claim 14, further including:
    said second distance exceeding said first distance by a factor of ten or more.

18. The well logging apparatus of claim 14, further including:
    said second distance exceeding said first distance by a factor of fifteen or more.

19. The well logging apparatus of claim 14, further including:
    said second distance exceeding said first distance by a factor of eighteen or more.

20. The well logging apparatus of claim 14, further including:
    said second distance exceeding said first distance by a factor of between eighteen and nineteen.

* * * * *